3,584,050
NITRATED AROMATIC ALKAMINES
Nathaniel Grier, Englewood, N.J., assignor to Merck & Co., Inc., Rahway, N.J.
No Drawing. Continuation-in-part of application Ser. No. 457,802, May 1, 1965, now Patent No. 3,399,199, dated Aug. 27, 1968. This application May 5, 1966, Ser. No. 547,780
Int. Cl. C07c 87/02, 87/68
U.S. Cl. 260—570.5      4 Claims

ABSTRACT OF THE DISCLOSURE

Compounds of the following formula wherein R is

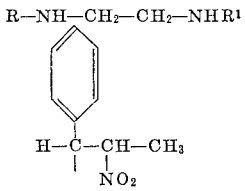

and $R^1$ is hydrogen or R and alkali metal salts of the aforesaid compounds. The compounds are useful for sterilizing and fumigating the soil, and which are active generally as antimicrobial agents as antimycotic agents, and also as pesticides.

---

This application is a continuation-in-part of my copending application Ser. No. 457,802, filed May 21, 1965 and entitled "Nitrated Alkamines and Methods of Utilizing Them Industrially, Agriculturally and Therapeutically," now United States Pat. No. 3,399,199, Aug. 27, 1968.

The present invention relates to antimicrobial and pesticidal compounds and compositions, to processes for preparing them, and to processes for applying them in agriculture, industry and therapeutics.

The invention is concerned particularly with compounds and compositions for sterilizing and fumigating the soil, and which are active generally as antimicrobial agents (fungicidal and bactericidal), as antimycotic agents, and also as pesticides (algicides, insecticides, ovicides, and larvicides), and for other similar purposes, and to processes for preparindg and for applying the same.

The invention relates to compositions containing, and to processes utilizing, various substituted alkyl-nitro compounds characterized by an amino function on the β-carbon (the carbon substituted by nitro being α) and embraced by the following general formulas:

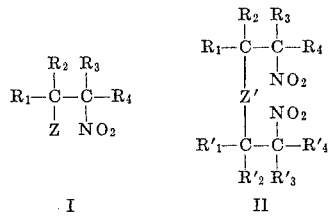

and their acid, metal and amine salts. In these formulas, Z is a susbtituted amino group while Z' is a diamino group; $R_1$ to $R_4$ and $R'_1$ to $R'_4$ can be the same or different members of the class consisting of hydrogen, alkyl (having 1 to 30 carbons, straight chain or branched, preferably lower alkyl, i.e. having up to 8 carbons), unsubstituted or substituted, as by one or more of the four halogens, nitro, amino, lower-alkyl substituted amino, hydroxyl, alkoxy (having 1 to 30 carbons, preferably lower alkoxy), aryl (such as phenyl, naphthyl, fluorenyl, anthracenyl, and phenanthryl), the alkyl (of the alkoxy) and the aryl groups be unsubstituted or substituted, as by one or more of the four halogens, nitro, alkyl up to 30 carbons, preferably 1 to 8, amino, lower-alkyl-substituted amino, and hydroxyl, alkyl-ether (having 1 to 30 carbons, preferably lower alkyl-ethers), and aryl-ether groups, the aryl group being as above defined; heterocyclics, such as thienyl, furyl, thiazolyl, pyridyl, oxazolyl and quinolyl, and substituted heterocyclics as by fluoro, chloro, bromo or iodo groups, nitro, lower alkyl (up to 8 carbons), amino and alkoxy (up to 30 carbons but preferably lower alkoxy).

It will be understood that Z can represent wide variety of substituted amino groups including polyamine radical of which only one amino nitrogen is attached to the paraffinic carbon adjacent to the carbon to which the nitro group is joined. In other words, a polyamine can be combined with one or more of the nitroparaffin (nitroalkane) groups.

The amine moiety Z, can be of great variety, and so far as I have been able to determine it is essential only that it be joined to the β-carbon of the alkane chain to the α-carbon of which a nitro group is attached. Thus, the amine can be aliphatic such as alkylenediamino, or the amino group or groups can be linked to a carbon atom forming part of a homocyclic or a heterocyclic ring structure, or it may itself form a part of a heterocyclic ring which may contain other hetero atoms along with the carbons, such as oxygen, sulfur, or nitrogen.

It may also be, in addition to ethylenediamino, propylenediamino and the like, an aryl- or heterocycle-substituted amine, like aniline, 2-, 3-, or 4-amino pyridine, pyrimidine, piperazine, and the like, and the amine nitrogen be further substituted (to the secondary form) by hydrocarbon, acyl or other non-interfering groups, as by lower alkyl (e.g., methyl, ethyl, propyl), phenyl, acetyl, butyroyl, benzoyl, and the like, while the ring structure can be further substituted in the manner exemplified by the following structural formula for the mono-nitroalkane derivative of piperazine:

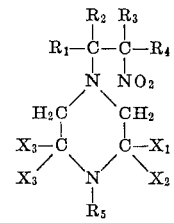

wherein $R_1$ to $R_4$ are as defined above, while $R_5$ and $X_1$ to $X_4$ can be the same or different members of the group consisting of hydrogen, lower alkyl, aryl and aralkyl, all as above defined, carboxy, carboalkoxy and hydroxyalkyl (having up to 30 carbons but preferably up to 8 carbons), while $R_5$ can also be acyl, as above indicated. The amino moiety Z' can be any of the radicals shown for Z with the proviso that Z' be diamino such that two nitroalkane moieties are connected through each nitrogen atom of Z'.

The compounds employed in the present invention, some of which are known solely as chemical substances, can be prepared in various ways. One satisfactory method involves condensing an aldehyde or ketone with an α-nitroalkane to form the corresponding nitro-olefine (the nitro group being attached to an olefinic carbon), followed by the addition of the primary or secondary amine to the α,β-unsaturated nitro-alkene. Thus on reacting 1-phenyl- 2-nitro-1-propene with ethylenediamine there is obtained the compound

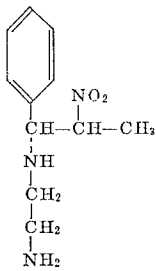

The reaction can be run at a range of temperatures extending from below room temperature, i.e., 0-10° C., to as high as 150° C.; solvents for the addition include the aliphatic alcohols, ketones, and hydrocarbons. Mixtures of these can be used along with water in varying concentrations. Ethers have been frequently selected as the solvents of choice. As a general rule, the major limitation, as to the solvent system employed is that it should be inert towards the reactants. In some instances it is possible to perform the addition using the reactants as such for the solvent. As is known, a selective choice of solvents can be made in those cases where a particular stereospecific mode of addition is desired, which results in a dominant yield of a given isomer.

I have found that the steps of forming the intermediate nitro-olefin and adding on the amine can with advantage be performed as a single operation by mixing the keto-containing compound (i.e., a ketone or aldehyde), the nitroalkane and the primary or secondary amine and causing them to react.

The utility of the compounds as antimicrobial agents is shown not only by their activity against bacteria and fungi responsible for stunting the growth, and even destruction, of many types of crop-producing plants, but also for those causing the degradation and deterioration of many types om materials. This includes paper, leather, textiles, aqueous preparations such as latex paints, adhesives, resins, pigment dispersions and oleoresinous coatings whose films are particularly vulnerable to the destructive action of fungi. The large economic losses encountered in paper making operations caused by the accumulation of bacterial and fungal slimes in various parts of the system can be eliminated to a significant extent by the use of the compounds herein described. In agriculture, a severe problem faced in the raising of cotton, beans, corn and other crops is the loss of yield per acre due to the action of soilborne fungi on seed and on the roots of the young plants. The fungi commonly associated with this are Rhizoctonia and Fusarium and Pythium species. Excellent control and elimination of these losses has been accomplished to a major degree by the use of the amino-nitroalkanes herein described as soil sterilants and fumigants in accordance with the invention. They can also be used on foliage and trees for the control of bacterial and fungal diseases.

I have found that compounds prepared by the addition of a primary or secondary amine or substituted amine, such as ethylenediamine and piperazine, to nitroolefines, and particularly to aryl- and heterocyclic- substituted nitroolefins, not only possess unusually high antimocrobial and pesticidal and the other activities mentioned above, but offer additional advantages in handling and use over the known nitroolefins (which have been used as antimicrobial agents) because they are generally colorless, practically odorless, have no lachrymatory action, and are resistant to hydrolysis and polymerization. Further, they have particular adaptability to a wide variety of systems by the choice of aryl or heterocyclic groups, and because of the capacity to form salts with acids, and with a large variety of metals by simple treatment in known manner with the acid or with a basic compound of the metal (the hydroxide, carbonate, or bicarbonate), or with other types of compounds of the metals in the presence of an alkali metal base, since the aminonitroalkanes are both amines and nitronic acids.

Also, it is known that nitroolefins are not active in alkaline medium and should not be used with alkali or alkaline agents, and are recommended for use in media having a pH of less than 7.0. (U.S. patent to Bousquet et al., No. 2,335,384, p. 2, lines 56-62). I have in fact found that alkaline solutions of nitroolefins, e.g. 1-phenyl-2-nitropropene, are inactive as growth inhibitors of destructive organisms. In contrast, and quite unexpectedly, alkaline solutions of the compounds herein described have enhanced antimicrobial activity and growth inhibitory properties, also against other destructive organisms.

A wide variety of nitroolefins having 2 or more carbons in the chain, and preferably from 2 to 8, are useful as intermediates in the preparation of compounds employed in the present invention. The aromatic aldehydes employed in the preparation of aryl-substituted nitroolefins include benzaldehyde, substituted benzaldehydes, as with one or more methoxy and other lower alkoxy groups (having up to 30 but preferably up to 8 carbons), or with hydroxyl, fluoro, chloro, bromo, iodo, nitro, aryl, alkyl and aralkyl (all as above defined), and including a plurality of mixed substituents; in fact, any substituents can be present which do not prevent the condensation of the aldehydo group with the nitroparaffin. Aromatic ketones capable of condensing with the nitroparaffins to form nitroolefins are equally usable. Those include benzophenone, benzophenones substituted as noted in the case of benzaldehyde, and other ketones of aryl, aralkyl and heterocyclic nature. The nitroparaffins may be nitromethane, -ethane, -propane, -butane or higher chain alkanes, as already mentioned, and isomers of these. The nitroolefins which contain heterocyclic substituents include those of furan, oxazole, pyridine, quinoline, thiazole, thiophene, indole, and other nuclei and their isomers or their derivatives which are obtainable from commercial sources or by synthesis and which have aldehydo groups or are available as ketones. These aldehydes and ketones can also be substituted in various positions of the rings with groups, such as those mentioned above, which do not prevent condensation with the nitroparaffins. Certain groups in the keto-containing compound which may compete in the condensation reactions, such as aromatic amino, may first be blocked by well-known modifications, such as benzoylation or acetylation, and the compound then condensed with the nitroparaffin followed by removal of the blocking group from the nitroolefin so produced; or, the final addition of the primary or secondary amine to such nitroolefin can be run and then the blocking group removed. For ease of isolation in other instances a carboxyl substituted nucleus may first be esterified, for example, with methyl, ethyl or benzyl alcohol, and after condensation and/or addition, saponified to liberate the esterifying alcohol.

Addition of the primary or secondary amine to the nitroolefin takes place with the nitrogen of the amine linking to the carbon, designated the β-carbon, and the hydrogen of the amine joining the α-carbon, i.e., this one carrying the nitro group.

As will be evident from the foregoing, in the case of diamines, such as ethylenediamines and piperazines, at least one of the amino nitrogens must have a hydrogen atom attached thereto to enable it to add onto the nitroolefin. Also blocking groups an adjacent carbons should be absent. Thus one of the nitrogen atoms of piperazine may have its hydrogen replaced. One or both of the two ring carbon atoms ortho to one of nitrogen atoms of the piperazines may be similarly substituted; but both carbons ortho to a least one of the nitrogens must be unsubstituted. For example, 2,6-dimethylpiperazine will serve as a useful adduct component but the 2,3- and 2.5-dimethylpiperazines do not add to nitroolefins, undoubtedly due to steric factors.

No specific time of reaction can be given which will cover the majority of the additions. It is possible for adducts to form as rapidly as the reactants are mixed or the reaction may require a number of hours. A particularly useful method for noting the progress of the addition is to measure the disappearance of the nitroolefin. This can be done by using spectrophotometric methods in many instances, the unsaturated nitro group showing strong absorption characteristics.

The products of the reaction are separated using such techniques as precipitation, fractional crystallization, or distillation in the case of liquids, or selective salt formation with acids or bases.

As explained hereinabove, the hydrogen of the amino group becomes linked to the α-carbon of the nitroolefin. This hydrogen is one of the groups listed in the definition for $R_4$ and $R'_4$ hereinabove and in the examples of the preparation of the adducts presented hereinbelow, this hydrogen is not replaced by another substituent. However, it can be replaced (as can $R_1$ to $R_3$ and $R'_1$ to $R'_3$ when any of them is hydrogen) by any of the other groups included in the definitions of such substituents hereinabove either by starting with suitably substituted nitroolefins, or by appropriate after-treatment of the formed amino-nitroalkanes, in known manner. as illustrated by Examples 11 and 12 hereinafter and Examples 27 to 30 of my above-identified copending application.

The metal salts referred to above are prepared in known manner and include the salts of sodium, potassium, calcium, magnesium, strontium, barium, aluminum, zinc, tin, iron, manganese, cobalt, nickel, arsenic, antimony, bismuth, vanadium, and the like.

The following examples illustrate satisfactory methods of the preparation of the compounds employed in the present invention:

EXAMPLE 1

N-(1-phenyl-2-nitropropyl) piperazine

A novel synthesis was accomplished in which the aldehyde and nitroparaffin were condensed with simultaneous use of the piperazine both as a catalyst and as a reactant. The amine served as an effective condensation catalyst, and at the same time added on to the resultant olefin to form the adduct. The desired product was obtained in high yield and good purity in a single step. The procedure was as follows:

15 g. (.2 mole) nitroethane and 21.2 g. (.2 mole) benzaldehyde were dissolved in 50 ml. methanol. To the clear solution there were added 13.8 g. (.16 mole) piperazine, anhydrous. Within 2 minutes and without external heating the temperature rose to 51° C. to give a clear, bright yellow solution. In less than 1 hour the mixture became difficult to stir because of the quantity of product which formed. It was maintained at 55° C. for 3 hours, cooled to 35° C., diluted with 75 ml. methanol and filtered. The product was washed with methanol and air-dried. A yield of 36.5 g. was obtained, over 90% of the theoretical based on piperazine.

From the filtrate there could be isolated the 2:1 adduct in less than 5% yield.

For large scale production the piperazine in methanol solution can be added gradually to the other reactants to control the exothermic reaction.

We have found that the concentration of reactants influences the relative amounts of adducts which result. For example, when the same reaction is carried out using the same proportions of reactants but increased the solvent from 50 ml. to 500 ml. the only product obtained is the 2:1 adduct. Evidently, at high dilution the 1:1 adduct changes over to the 2:1 compound owing to the higher stability of the latter.

However, although the above-described experiments show that the 1:1 adduct is the expected product at high concentration conditions, the opposite result was, nevertheless, obtained in the synthesis of the following two products. The same proportions of reactants were used with the equivalent of only 50 ml. methanol as the reaction solvent.

EXAMPLE 2

N,N'-bis(1-p-isopropylphenyl-2-nitropropyl) piperazine 45 g. (.6 mole) nitroethane and 88.8 g. (.6 mole) p-isopropylbenzaldehyde were dissolved in 150 ml. methanol. There were then added to the clear solution 41.4 g. (.48 mole) piperazine, anhydrous. A cooling bath was used to moderate the exothermic reaction. In less than 1 hour a heavy precipitate developed. The mixture was held at 40–50° C. for 4 hours and allowed to cool gradually overnight. At room temperature an additional 50 ml. methanol were added and the product separated by filtration. It was washed with methanol followed by diethyl ether. A colorless solid resulted; yield 111.5 g. It was the bis-adduct melting at 166–170° C. and showing correct elemental analysis. The melting point could be raised by recrystallization.

EXAMPLE 3

N,N'-bis(1-phenyl-2-nitropropyl) piperazine (2-nitropropenyl) benzene (3.26 g.) was dissolved with constant stirring in anhydrous ether (2.5 ml.). Piperazine crystals (0.86 g.) were dissolved in abs. EtOH (5 ml.) and added to the clear etheral solution of (2-nitropropenyl) benzene; almost immediately a thick white precipitate started to separate. The reaction was allowed to continue for ½ hour with stirring. The mixture was then filtered and washed with a few milliliters (5 to 10 ml.) of anhydrous ether. The crude residue weighed 2.80 g. It was recrystalized twice from hot methanol which, on cooling, yielded white crystals melting sharply at 172–173° C.

Although a 2:1 molar ratio of olefin-piperazine was used the initial reaction product is a 1:1 adduct. On recrystallizing this product repeatedly from solvents, dismutation occurs with conversion to the 2:1 adduct. This is also obtained with the other piperazine adducts described hereinafter. In some instances, even when initial reactant proportions are equimolecular, the 2:1 adduct predominates in the reaction product.

EXAMPLE 4

N,N'-bis(1-p-chlorophenyl-2-nitroethyl) piperazine p-Chloro-β-nitro styrene (3.67 g.) was dissolved in anhydrous ether (30 ml.) by constant stirring. Piperazine (0.86 g.) was dissolved in absolute ethyl alcohol (10 ml.) and the solution was gradually added to the clear yellow solution of p-chloro-β-nitrostyrene. The yellow color immediately disappeared, and almost immediately a flocculant white solid separated. Stirring was continued for ½ hour to complete the reaction, the mixture was filtered, and the residue washed with a few mls. (5–7) of ether. It weighed 2.5 g. It was recrystallized from hot toluene, which on cooling of the clear solution gave white crystals, M.P. 130–132° C.

EXAMPLE 5

N-methyl-N'-(1-phenyl-2-nitropropyl) piperazine

To phenyl nitropropene (3.26 g.) was added dropwise N-methyl piperazine (2.0 ml.). The reaction flask became fairly warm, and almost immediately a clear yellow solution resulted which solidified at room temperature in a few minutes (5–7 min.), leaving a faintly yellow solid (2.8 g.) which was scraped out of the flask and was very soluble in most organic solvents. It was recrystallized, using acetone-water; white long needles separated which melted sharply at 79–80° C.

EXAMPLE 6

N-(1-phenyl-2-nitropropyl)-2-methyl piperazine 3.26 g. of (2-nitropropenyl) benzene were dissolved at room temperature in diethyl ether (50 ml.) with stirring by a magnetic stirrer; 2-methyl piperazine (2.00 g.) was dissolved in ethanol (15 ml.) and the solution was added to the yellow clear ether solution with continued stirring. In about 2 minutes a thick white solid separated, so thick that it could not be stirred easily; more (10 ml.) ethanol was added and stirring continued for one and one-half hours. The solid was filtered, washed with ether-alcohol (15–20 ml.) twice dried at room temperature and weighed: 4.00 g., M.P. (crude) 125–129° C.

The product was dissolved in warm methanol; on cooling white crystals separated which melted at 139–142° C.

EXAMPLE 7

Fusion synthesis of N,N'-bis(1-phenyl-2-nitropropyl) piperazine 1-phenyl-2-nitropropene (14 g., .085 mole) was melted in a beaker and to the clear brown liquid at 80° C. well-ground solid piperazine (3.6 g., .0425 mole) was added. The reaction was exothermic, the temperature climbs to 120° C. Mixing was continued for 10–15 min. The light yellow solid was cooled to room temperature, ground, and washed 3 times with diethyl ether (50 ml. portions) and dried. Yield: 14.2 g. On recrystallization from hot toluene white crystals, M.P. 194–195° C. were obtained. The compound analyzed for the 2:1 adduct in excellent agreement with theory (2 moles of the 1-phenyl-2-nitropropene to one of the piperazine).

EXAMPLE 8

Di-(p-nitrobenzoic acid) salt of N,N'-bis(1-phenyl-2-nitropropyl) piperazine

Simultaneous conversion of the 1:1 compound to the 2:1 compound (2 moles of the nitropropyl compound to 1 mole of the amine) with salt formation is illustrated by the following procedure:

N-(1-phenyl - 2 - nitropropyl)-piperazine (.824 g.) was dissolved in hot methanol (20 ml.) and the clear solution added to a methanolic solution of p-nitrobenzoic acid (.668 g.). With stirring and scratching fine white needles separated. After cooling and filtering, 1.1 g. of product was obtained. It was recrystallized from methanol, M.P. 207° C. Analysis showed it had the composition, $C_{36}H_{38}N_6O_{12}$, i.e. the salt of the 2:1 adduct with 2 moles of p-nitrobenzoic acid.

EXAMPLE 9

Salicyclic acid salt of N,N'-bis(1-phenyl-2-nitropropyl) piperazine

N,N' - bis(1-phenyl-2-nitropropyl)piperazine (0.64 g.) was dissolved in hot methanol (15 ml.). An alcoholic solution of salicylic acid (0.122 g.) was added to the cold solution of piperazine adduct with constant shaking and cooling. In a few moments a pinkish-white crystalline solid was deposited which was cooled and filtered, washed with (1–2 ml.) of methanol and dried. It was recrystallized from hot isopropanol; the crystals were separated on cooling and melted with decomposition at 225–226° C.

EXAMPLE 10

N,N'-bis(1-phenyl-2-nitropropyl) ethylenediamine

To a solution of 32.6 g. of (2-nitropropenyl)benzene (0.2 M) in anhydrous ether (250 ml.) were added gradually 7.1 ml. ethylenediamine (98–100%) (0.1 M) with constant stirring and cooling in an ice bath. In about one-half hour, the oily residue crystallized as a white solid, which was filtered and washed with a few milliliters of dry ether (10–15 ml.), dried, and weighed 9.5 g. first crop; on cooling and stirring the mother liquor, 1.5 g. more solid was collected. It was recrystallized with hot benzene; on cooling, greyish-white crystals separated which melted sharply at 121–123° C.

*Analysis.*— Calcd. for $C_{20}H_{26}N_4O_4$ (percent): C, 62.18; H, 6.74; N, 14.57. Found (percent): C, 62.60; H, 6.60; N, 14.47.

Hydrochloride salt.—N,N' - bis(1 - phenyl - 2 - nitropropyl)ethylenediamine (1.5 g.) was mixed with HCl (6 M, 20 ml.). All of the solid dissolved except for a few crystals, and in a few minutes, on scratching, a thick white solid precipitated out as hydrochloric acid salt. The latter was filtered, and dried, and dissolved in hot acetone. On cooling, white crystals separated (M.P. 120–124° C.).

p-Toluene sulfonic acid salt.—N,N'-bis(1 - phenyl-2-nitropropyl)ethylenediamine (1.0 g.) was shaken with an alcoholic solution of p-toluene sulfonic acid (1.1 g.) which formed a clear solution, and immediately settled as a thick white precipitate. The latter was filtered and dried.

Yield: 0.35 g., M.P. (crude) 158–160° C. dec.

It was recrystallized by solution in hot EtOH from which, on cooling, fine crystals separated which melted sharply at 159–160° C. with decomposition.

Phosphoric acid salt.—N,N'-bis(1 - phenyl - 2 - nitropropyl)ethylenediamine (1.5 g.) was mixed with phosphoric acid (50% aqueous solution), a clear solution being obtained. In a few minutes, on shaking and scratching, the reaction product separated out as the phosphoric acid salt, which was filtered and dried; the crude material melted at 140–145° C. It was recrystallized using methanol; M.P. 150–152° C.

EXAMPLE 11

N,N'-diacetyl N,N'-bis(1-phenyl-2-nitropropyl) ethylenediamine

N,N'-bis(1 - phenyl - 2 - nitropropyl)ethylenediamine (1.9 g.) was suspended in dry benzene (20 ml.) in a r.b. flask, pyridine (0.5 ml.) was added to the mixture and acetyl chloride (0.6 ml.) was transferred to the reaction flask dropwise, with constant shaking. The reaction proceeded with rise in temperature, forming a pale yellow solution. Gradually a whitish precipitate of pyridine hydrochloride started to settle; the reaction vessel was left at room temperature for approximately ½ hour; distilled water (15 ml.) was added to the mixture, and extraction with 10–15 ml. of water was repeated three times. The benzene layer was carefully separated, dried over $CaCl_2$ for ½ hour, filtered, and evaporated under reduced pressure. The residue was recrystallized using hot acetone, fine needles separating on cooling which melted sharply at 172–173° C.

*Analysis.*—Calcd. (percent): C, 61.20; H, 6.35; N, 11.94. Found (percent): C, 61.14; H, 6.51; N, 12.00.

EXAMPLE 12

N,N'-benzoyl derivative of N,N'-bis(1-phenyl-2-nitropropyl) ethylenediamine

N,N'-bis(1 - phenyl - 2 - nitropropyl)ethylenediamine (2.8 g., 0.01 M) was suspended in dry benzene (25 ml.), and was stirred, and pyridine (0.5 ml.) was added gradually to the stirring mixture. Benzoyl chloride (2.8 g.) was then gradually added, and the mixture stirred for ½ hour, during which time a cloudy white precipitate of pyridine hydrochloride separated out. This was extracted three times, using 10–15 ml. of water. The benzene layer was separated and dried over anhydrous $MgSO_4$ for about 30 minutes; it was then filtered and the solvents crystallized, using hot anhydrous EtOH, white crystals separating out on cooling, which melted at 209–211° C.

*Analysis.*—Calcd. (percent): C, 68.85; H, 5.7; N, 9.4. Found (percent): C, 69.30; H, 5.82; N, 9.50.

EXAMPLE 13

1-morpholino-2-nitro-1-phenyl propane

Following the procedure described in J.A.C.S. 79, 6226, 1957, a solution of 16.3 g. (0.1 M) of (2-nitropropenyl)-benzene in 100 ml. of a mixture of two volumes of petroleum ether and one volume of benzene was immersed in an ice bath and 8.7 ml. of morpholine were added dropwise while agitating the mixture. After standing in agitating ice bath an oily residue separated which on agitation crystallized to a white solid. This was filtered and washed with a few milliliters of benzene.

EXAMPLE 14

N-(1-phenyl-2-nitropropyl)ethylenediamine (2-nitropropenyl) benzene (16.3 g., 0.1 mole) was dissolved completely in diethyl ether (100 ml.). With constant stirring, ethylene diamine (6.2 ml., 0.1 mole) was added gradually to the clear yellow solution of phenyl-nitropropene; the mixture was stirred and cooled in an ice bath for about 30–45 minutes. The oily layer which separated on addition of the amine turned to a white solid. This was filtered, washed with ether (10–20 ml.), and dried. It weighed 21.0 g. The crude material melted with decomposition at 72–74° C. The compound decomposes at room temperature with a strong odor of amine, but can be stored in the refrigerator at a temperature of 5–7° C. for a number of days without appreciable decomposition.

EXAMPLE 15

N,N'-($\alpha,\alpha'$-di-(2-chlorophenyl)$\beta,\beta$-dinitrodiethyl)-p-phenylenediamine The compound was prepared by reacting two equivalents of 2-nitro-$\beta$-(2-chlorophenyl)-ethylene and one equivalent of p-phenylenediamine in alcohol [D. Worrall, J.A.C.S. vol. 60, p. 2845 (1938)]. It was obtained as yellow plates melting with decomposition at 147–148° C.

As disclosed in my above-mentioned copending application, many more amino-nitroalkanes substituted on the $\beta$-carbon by piperazine or by substituted piperazines, are indicated for use as soil sterilants and fumigants and for other purposes. Said copending application and all of its disclosure, not expressly reproduced in the present specification, are hereby incorporated herein by reference.

Among the other substituted nitroalkenes that can form useful adducts with primary and secondary amines may be mentioned 1- and 2-($\beta$-nitrostyryl)naphthalene, their 5-bromo and 5-bromo and 8-nitro derivatives, 1-($\beta$-nitrostyryl)-2,7-dimethoxy-naphthalene,
1-($\beta$-nitrostyryl)-8-nitronapthalene,
4-chloro-1-(4-nitro-$\beta$-nitrostyryl)napthalene,
2-(4-chloro-$\beta$-nitrostyryl)-6-methoxynaphthalene,
2-(4-bromo-$\beta$-nitrostyryl)-5-chloro-6-methoxynaphthalene and 4-methyl-1-(3-nitro-$\beta$-nitrostyryl)naphthalene;
hydroxynitrostilbenes,
such as 3-hydroxy-$\alpha'$-nitrostilbene,
4-hydroxy-$\alpha'$-nitrostilbene,
3-hydroxy-$\alpha'$-nitrostilbene,
3-bromo-4-hydroxy-$\alpha'$-nitrostilbene,
3-bromo-2'-chloro-4-hydroxy-$\alpha'$-stilbene,
2'-chloro-3-hydroxy-$\alpha'$,
4-dinitrostilbene, 4-hydroxy-$\alpha'$, 4-dinitrostilbene,
4'-ethyl-4-hydroxy-$\alpha'$-nitrostilbene, and analogous compounds prepared as described in U.S. Patent No. 2,914,570; and the additionally substituted $\alpha'$-nitrostilbenes described in U.S. Patent No. 2,855,443.

Still other nitroalkenes which can be reacted with the primary and secondary amines in accordance with the present invention are described in U.S. Patent Nos. 2,335,384, and 2,673,223 (which disclose, among others, 1-(1-cyclohexen-3-yl)-2-nitropropene, No. 2,895,869 (which discloses various halogenated nitroalkenes and aryl- and aralkyl-substituted halogenated nitroalkenes, among them 3,3-dichloro-1-nitropropenes, 1,1,1-trichloro-3-nitro-2-butene, 1,1,1-trichloro-3-nitro-2-pentene, 3,3-dichloro-1-nitro-1-phenylpropene and 3,3-dichloro-1-nitro-1-phenethylpropene); and in Patent No. 2,899,429; and in the article by Schales and Graefe, "Arylnitroalkenes: A New Group of Antibacterial Agents," J.A.C.S. 74, 4486–90 (1952). All of these nitroalkenes form antimicrobial adducts with the piperazine above described and are useful as soil sterilants and fumigants.

Other substituted piperazino-nitro-alkanes are obtained in accordance with the invention by employing substituted 1-phenyl-nitroethenes, such as $\alpha$-chloro-$\beta$-nitrostyrene, (R. D. Campbell and F. J. Schultz, J. Org. Chem., vol. 25, 1877 [1960]); to yield 1-phenyl-1-chloro-1-N-piperazino-2-nitroethane. The olefin 2,3-dinitro-2-butene will give, for example, N-[2-(2,3-dinitrobutyl)]piperazine.

There can also be introduced, for example, a hydroxyalkyl group at the $R_3$-position of the adduct, as by reacting 1-phenyl-1-($N^4$-methylpiperazino)-2-nitropropane with formaldehyde to yield N-[1-phenyl-2-hydroxymethyl-2-nitropropyl]-$N^4$-methylpiperazine.

Procedures for introducing further substituents into the alkane radical are illustrated in Examples 27 to 30 of my above-mentioned application and similar procedures can be employed to the same end for the other aminonitroalkanes disclosed herein where they are capable of further substitution. The method of preparing the sodium and potassium salts are generally similar to the procedures described in Examples 31 to 33 of said application.

Agricultural applications

The wettable powder formulation for use as a dispersion in water represents a practical means for good distribution in soil. Other methods of achieving the same results include the preparation of dusts. All of the nitroamines can be blended as fine powders with the commonly used powder diluents such as talc, clay, refined silicates, wood flour, sand, magnesium oxide, calcium carbonate, fuller's earth, kaolin, diatomaceous earth, mica, pumice, and the like. The powder can have the following formulation:

|  | Percent |
| --- | --- |
| Nitroamine | 1–75 |
| Inert diluent (clay, talc, etc.) | 25–99 |

The mixtures may be finely powdered, e.g., to the 1–10 micron average particle size, or be made by blending the already finely powdered ingredients.

For application as sterilants the dusts may be applied to the seed and surrounding soil at the time of planting. The concentration of the sterilant is adjusted to give an effective, nonphytotoxic dosage in the soil. In general, the soil concentration of nitroamine should be from 10 to 25 parts per million (of active ingredient). For most economical and effective use the dusts can be applied in bands of 6 to 8 inches centered on the rows just prior to seeding. The material can then be rototilled to a depth of several inches. This mode of treatment saves material and protects the root system of young plants by sterilizing the soil to a diameter of about 8 inches around the forming roots. For the protection of a given crop, such as cabbage, the band spread of sterilant can vary from 8 inches for black root disease to 12–15 inches for club root disease prevention. Similarly, the depth to which the fungicide should be distributed can vary from 2 to 6 inches.

The wettable powders can be prepared by the addition of 0.1–5% of a wetting agent to the powder blends. Many dispersing agents are commercially available which are non-phytotoxic at the required concentrations. These may, for example, be alkali metal and amine salts of sulfated and sulfonated acids, alcohols, and oils, or polyethoxylated phenols, long chain fatty amine quaternary salts, partial fatty acid esters of polyhydric alcohols, or the like. The same types of dispersants can be used in preparing emulsifiable concentrates of the nitroamines in organic solvents. Many of these agents are available in solvent-soluble form. The manner of application to the soil is similar to the dusts. Spray equipment is used to spread the suspensions or emulsions over the soil, and by discing the fungicidal agents can be uniformly distributed to varying depths. Spray application is also effective for band-limiting the dosages.

Other agricultural uses for these formulations involve the eradication of bacterial blights of plants by application to the involved surface areas. The compounds of this invention show high orders of bacterial inhibition and are especially useful for this purpose. Some of the diseases which are of commercial importance in decreasing yield and quality and are controlled by the compositions of the invention are fire blight of apple and pear, bacterial spot on stone fruit, cherry leaf spot, walnut blight, common blight of bean, bacterial spot of tomato and pepper, and potato seed piece decay. The effective concentration of nitroamines required varies from 5–100 parts per million; they may be applied as dusts, powder dispersions in water, emulsions in water, or as aqueous dipping baths. Other plant fungal diseases which can be controlled by treatment with these formulations are fungal in orgin, such as the many kinds of powdery mildew and leaf scabs.

For seed treatment, proportions as low as 1 to 4 ounces per hundredweight (150 to 600 p.p.m. of seed) have been found to be effective against various fungi. Thus in the case of N-(1-phenyl-2-nitropropyl) piperazine, 150 p.p.m. were found not only to be sufficient to protect corn seeds, but also to promote an unusually healthy root growth with an improved rate of germination of healthy seedlings and a higher yield of an improved crop.

Paint applications

The nitroamines are highly effective as fungicides for protecting paint films against the degradation caused by such fungi as *Pullularia pullulans* and *Aspergillus niger*. They are particularly useful in overcoming another important problem in the paint industry, namely, the preservation of aqueous coatings against bacterial fermentation during storage. It is known that the principal systems in use are particularly vulnerable to such attack; these include coatings based on polyvinyl acetate, butadiene-styrene, and acrylic polymer and co-polymers. The other additives required in the formulation of aqueous coatings also contribute substantially to aiding the growth of bacteria. These nutrient sources include thickeners, such as cellulose derivatives, casein and lecithin; and also film plasticizers, coalescents, stabilizers, and dispersants. Monomers, by-product salts, and organic liquids are also metabolized by bacteria. Even the pH range at which these coatings are adjusted for maximum stability favors bacterial growth. Some of the end results of bacterial attack on these systems are foul odor development, decreased viscosity, breakdown of the colloid, and downward shift in PH. In addition, gas evolution with resultant pressure build-up in closed systems has resulted in lids of containers being blown off with scattering of contents.

The nitroamines are particularly advantageous in this application. They provide effective inhibition of microbial growth at relatively low concentrations, in the range of 5–100 parts per million, they are colorless and odorless, so that no interference with coating properties occurs, and are low in toxicity and vapor pressure. An effective use concentration to insure long shelf-life stability of the coating compositions is 0.05–0.1% by weight of the whole composition.

The nitroamines can be finely ground and then incorporated by simple mixing, or preferably, addition can be made at the pigment grinding phase of paint manufacture. This is recommended for aqueous and oleoresinous coating systems. The antimicrobial agents are compatible with practically all of the commonly used paint ingredients, and unlike the presently used phenylmercury salts do not undergo degradation or other reactions with sulfide-containing pigments such as lithopone. Moreover, a decided advantage is realized in that the presence of atmospheric hydrogen sulfide causes no darkening of paint films preserved against mildew attack with the nitroamines, whereas the mercurials and other metallic agents cause colored sulfides to form.

Another advantage lies in the amphoteric nature of the nitroamines. In aqueous coating compositions a high degree of compatibility exists; the compounds are fully active at either the acid or alkaline pH conditions selected in any particular case for maximum colloid stability. These include polyvinyl acetate, butadiene-styrene, and acrylic coating compositions, both homopolymer and copolymer based. The antimicrobials can be incorporated in various known interior and exterior paints. The butadiene-styrene containing coatings are generally for interior use only and usually are not dosed with an antimicrobial agent for mildew protection. However, preservatives for in-container inhibition of fermentation must be used. A typical known type of outdoor paint which is protected against fungal attack by the addition thereto of about 0.5% by weight of, for example, N-(1-phenyl-2-nitropropyl) piperazine, 1-piperazino-2-nitro-1-p-tolylpropane, N,N'-bis(1 - phenyl-2-nitropropyl) ethylenediamine, or N,N'-bis[1-(o-chlorophenyl - 2 - nitropropyl]piperazine, by mixing in a blender for 3 minutes is the following:

|  | Lbs. |
|---|---|
| Titanium dioxide | 250 |
| Zinc oxide | 200 |
| Calcium carbonate (powdered) | 400 |
| 325 mesh water ground mica | 50 |
| Alkali refined linseed oil | 300 |
| X-Bodied linseed oil | 100 |
| 24% lead naphthenate | 10 |
| 6% Manganese naphthenate | 1.5 |
| Mineral spirits to bring the viscosity to 82 KU (Krebs units) | 106+ |

Finished paint:
  Pigment volume concentration=37.8%
  4 lbs. oil/gallon
  9 lbs. pigment/gallon Filter paper specimens (1.5 inch squares of No. 30 Whatman filter paper) on which films of the above paint compositions containing the different nitroamines had been dried were placed on the surface of plates of Sabouraud Maltose Agar overlaid with 1.25 ml. of spore suspension of *Pullularia pullulans* so that the suspension was distributed over the face of the test specimens and the plates incubated at 28–30° C. and 85–90% relative humidity. The specimen showed no growth after 4 weeks; the paint containing the N-(1-phenyl-2-nitropropyl) piperazine showing also a zone of inhibition around the painted area.

A satisfactory method of incorporation of the nitroamines is by way of solutions. Many of them are soluble in such organic solvents as xylene, Stoddard solvent (petroleum distillate, at least 50% distilling at 177° C. and all at 210° C.), toluene, and turpentine, so that solutions containing 1–50% of these can be simply stirred into oil paints in sufficient amount to give final concentrations of from 0.05–1.0% by weight of total formulation; the dosage is based on the susceptibility of the finished film to mold attack and also the kind of areas in which the coating will be used. For example, the higher level of nitroamines would be required in blister-resistant alkyd coatings containing no zinc oxide for use in warm humid climate such as the Gulf coast area of the U.S.A. Low levels are recommended in oil paints containing high loadings of zinc oxide which give a glossy, hard film on drying. In low humidity areas, e.g., the Los Angeles region, a small concentration of the nitroamine would suffice. A suitable method for determining dosage is that of J. Ramp and N. Grier (Fungicides in paints. Official Digest, Journal of Paint Technology and Engineering, volume 33, September 1961).

The solvent solutions described can be made suitable for use in water-based coatings by incorporating a small percentage of emulsifying agent, usually 2–5%, and a small amount of coupling solvent, i.e., having both oil and water solubility, such as the lower alcohols, glycols, glycol ethers, dioxane, and the like, in concentrations of up to 10% of the total antimicrobial solution. This type of preparation can also be used in the oleoresinous systems without producing harmful effects on film properties.

Another mode of adding the nitroamines to aqueous coatings is by use of alkaline solution in water or water-alcohol. The nitroamines are readily dissolved in the nitronic acid form by the aid of alkaline reagents such as the inorganic alkalis like sodium hydroxide, potassium hydroxide and ammonium hydroxide, and by water-soluble amines, preferably tertiary, for maximum stability of the initial solutions.

Insecticidal applications

The products employed in this invention, such as 1-piperazino-2-nitro-1-(p-chlorophenyl) propane, 1-(2-methyl-piperazine)-2-nitro-1-phenylpropane, 1 - nitro - 2 - (N-piperazino)-3,3-dichloro-propane, 1,1,1 - trichloro - 2 - (N-piperazino)-3-nitrobutane, 1,1,1 - trichloro - 2 - (N-piperazino)-3-nitropentane, and the corresponding ethylenediamine, morpholino and other heterocyclic amine derivatives of nitroalkanes herein disclosed, can be dissolved in various solvents such as the chlorinated hydrocarbons (chloroform, carbon tetrachloride, tetrachloroethylene), the aliphatic alcohols (methyl, ethyl, propyl, isopropyl, butyl), benzyl, alcohol, aromatic solvents (benzene, toluene, xylene), or in typical kerosene blends in sufficient concentrations e.g. 0.5–5% to cause knockdown and/or death to various insects and pests. These include the common horsefly, mites, beetles, caterpillars, milkweed bugs, aphids, nematodes, insect larvae, and the like.

The nitroamines can be used in the form of aqueous suspensions or emulsions, the products being generally insoluble in water. For this type of formulation various powdered carriers can be employed to aid in achieving uniform distribution. Talc, fuller's earth, calcium silicate, calcium carbonate, clays and the like are admixed with the insecticidal agent along with wetting and dispersing agents and sticking agents. For maximum chemical compatibility those which are non-ionic in character are preferred. Anionic surfactants, such as sodium lauryl sulfate or sodium ligninsulfonate are also satisfactory.

In tests on nematodes (Panagrellus) suspended in water (30 to 50 individuals), the compounds N-1-(1 - phenyl-2-nitropropyl)piperazine, N-1-[1-(o-chlorophenyl)-2-nitropropyl]piperazine were all found to be substantially equal in potency to hexyl resorcinol at concentrations of 0.1 to 0.0001%, there being a 100% kill with all these compounds at concentrations of 0.1 and 0.01%, while for all compounds, including the comparison compound, the kill fell to substantially that of the control suspension for concentrations of 0.001 and 0.0001%.

For certain uses, particularly as nematocides or as a general soil pesticide, it is desirable that the compounds employed have a sufficiently high vapor pressure to diffuse as a vapor throughout the soil and thus act as a fumigant. It is accordingly within the ambit of the invention to employ nitroalkenes as starting materials which are so substituted that they have an increased vapor pressure over aryl-substituted alkenes. Thus, adducts of higher vapor pressure will be obtained by reacting in the manner heretofore stated, known halogenated nitroalkenes devoid of an aryl group.

Use in paper mills

Compounds of the invention have been found to be effective also against the organisms that cause slime and deterioration of pulp and paper mills. Thus, tested against the following organisms:

Alcaligenes viscolactis, ATCC 337, 24 hour cultures.
Bacillus subtilis, 24 hour culture,
Salmonella typhosa, ATCC 6539, 24 hour culture,
Staphylococcus aureus, ATCC 6538, 24 hour culture, the compound N-(1-phenyl-2-nitropropyl)piperazine inhibited growth at concentrations of about 20 to 40 p.p.m., while the analogous ethylenediamine compound showed comparable activity.

The nitrogens of the amino moiety can be quaternized to yield compounds having properties similar to the bases. Thus, the compounds can be treated with methyl bromide, ethyl chloride, benzyl chloride, ethyl sulfate and other quaternizing agents in known manner. Also, acid salts, as already indicated, can be formed of the bases; for example, the hydrochloric, sulfuric, phosphoric, p-toluenesulfonic, salicyclic, sulfopalmitic and other acid salts of N-(1-phenyl-2-nitropropyl)piperazine and of the corresponding ethylenediamine, morpholino and other heterocyclic amine derivatives. Also, because of the nitronic acid group, various amine salts can be prepared in known manner, such as salts with triethanolamine, triethyl amine, tributylamine, tripropanolamine and the like.

When the procedure of the foregoing examples is repeated using in place of the maines described therein, equivalent amounts of aniline, propylenediamine, butylenediamine, 2-aminopyridine, 3-aminopyridine, 4-aminopyridine or pyrimidine, preferably by the addition thereof to the nitroolefin, the corresponding aminonitroalkane is obtained.

It should be understood that although this invention has been described with reference to particular embodiments thereof, changes and modifications may be made which are within its intended scope and it should be limited only by the language of the appended claims.

I claim:
1. The compound having the formula

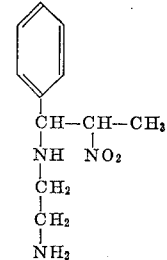

or an alkali metal salt thereof.
2. The potassium salt of the compound of claim 1.
3. The compound having the formula

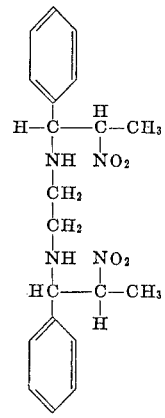

or an alkali metal salt thereof.

4. The potassium salt of the compound of claim 3.

References Cited

UNITED STATES PATENTS 3,412,130  11/1968  Schafer et al. _____ 260—570.5X

ROBERT V. HINES, Primary Examiner

U.S. Cl. X.R.

47—58, 106—15, 288, 296, 297, 300, 308; 117—138.5, 138.7; 162—161; 260—247.5, 256.4, 268, 288, 296, 306.8, 307, 329, 332.3, 347.7, 429, 429.7, 429.9, 439